(12) United States Patent
Hanaoka et al.

(10) Patent No.: US 10,754,120 B2
(45) Date of Patent: Aug. 25, 2020

(54) PROJECTION LENS BARREL AND PROJECTION DISPLAY DEVICE

(71) Applicant: Nittoh Inc., Suwa-shi, Nagano (JP)

(72) Inventors: Takafumi Hanaoka, Suwa (JP); Takahiko Matsuo, Suwa (JP); Takuya Fujimatsu, Suwa (JP)

(73) Assignee: Nittoh Inc. (JP)

( * ) Notice: Subject to any disclaimer, the term of this patent is extended or adjusted under 35 U.S.C. 154(b) by 0 days.

(21) Appl. No.: 16/252,995

(22) Filed: Jan. 21, 2019

(65) Prior Publication Data

US 2019/0154950 A1    May 23, 2019

Related U.S. Application Data

(63) Continuation of application No. 15/519,467, filed as application No. PCT/JP2015/074251 on Aug. 27, 2015, now Pat. No. 10,222,576.

(30) Foreign Application Priority Data

Oct. 15, 2014   (JP) .................. 2014-211091

(51) Int. Cl.
*G02B 3/00* (2006.01)
*G02B 7/02* (2006.01)
(Continued)

(52) U.S. Cl.
CPC ............... *G02B 7/028* (2013.01); *G02B 7/04* (2013.01); *G02B 13/16* (2013.01);
(Continued)

(58) Field of Classification Search
CPC .................................................... G02B 7/028
(Continued)

(56) References Cited

U.S. PATENT DOCUMENTS 1,325,936 A    12/1919   Fouasse
4,236,790 A    12/1980   Smith
(Continued)

FOREIGN PATENT DOCUMENTS

GB        561503 A       5/1944
JP    H06-186466 A       7/1994
(Continued)

OTHER PUBLICATIONS

Extended European Seach Report for EP Application No. 15850169.2, dated May 14, 2018 (7 pages).
(Continued)

*Primary Examiner* — James C. Jones
(74) *Attorney, Agent, or Firm* — Harness, Dickey & Pierce, P.L.C.

(57) ABSTRACT

In order to provide a projection lens barrel and a projection display device that are capable of correcting the optical characteristics of a plurality of lens groups, a projection lens barrel, comprising a lens optical system causing light from an image display element to be formed as a projected image on a screen, also comprises correction mechanisms that move each of at least two lens groups along an optical axis and correct the optical characteristics to be corrected, said lens groups each having different optical characteristics for correction in order to suppress reduction in image quality of a projected image caused by changes in optical characteristics caused by temperature changes in the projection lens barrel.

15 Claims, 5 Drawing Sheets

(51) Int. Cl.
*G03B 21/14* (2006.01)
*G02B 7/04* (2006.01)
*G02B 13/16* (2006.01)
*G02B 27/00* (2006.01)

(52) U.S. Cl.
CPC ......... *G02B 27/0025* (2013.01); *G03B 21/14* (2013.01); *G03B 21/142* (2013.01)

(58) Field of Classification Search
USPC .......................................................... 359/649
See application file for complete search history.

(56) References Cited

U.S. PATENT DOCUMENTS

| | | | |
|---|---|---|---|
| 6,084,719 A | 7/2000 | Sugawara et al. | |
| 6,118,599 A | 9/2000 | Spinali | |
| 2003/0137746 A1* | 7/2003 | Kitaoka | G02B 7/028 359/687 |
| 2007/0236810 A1 | 10/2007 | Masui et al. | |
| 2010/0165492 A1* | 7/2010 | Kimura | G02B 7/021 359/820 |
| 2010/0265419 A1 | 10/2010 | Hayashi et al. | |
| 2013/0003025 A1 | 1/2013 | Cheng et al. | |
| 2015/0293434 A1 | 10/2015 | Matsuo | |

FOREIGN PATENT DOCUMENTS

| | | |
|---|---|---|
| JP | H11-72700 A | 3/1999 |
| JP | 2003-248171 A | 9/2003 |
| JP | 2003-262778 A | 9/2003 |
| JP | 2006-211251 A | 8/2006 |
| JP | 2008-026864 A | 2/2008 |
| JP | 2010-256394 A | 11/2010 |
| JP | 2014-112156 A | 6/2014 |
| WO | WO-2014-103324 A1 | 7/2014 |

OTHER PUBLICATIONS

Office Action for Japanese Patent Application No. 2014-211091 dated Sep. 4, 2018 (3 pages) with English translation (3 pages).
Japanese Office Action for Patent Application No. 2018-237733 dated Jan. 27, 2020 with English translation (5 pages).

* cited by examiner

PROJECTION LENS BARREL AND PROJECTION DISPLAY DEVICE

CROSS REFERENCE TO RELATED APPLICATIONS

This application is a continuation application of U.S. patent application Ser. No. 15/519,467, filed on Apr. 14, 2017, which is a U.S. National Phase Application under 35 U.S.C. 371 of International Application No. PCT/JP2015/074251, filed on Aug. 27, 2015 and published in Japanese as WO 2016/059890 A1 on Apr. 21, 2016 which is based on and claims the benefit of priority from Japanese Patent Application No. 2014-211091 filed Oct. 15, 2014. The entire disclosures of all of the above applications are incorporated herein by reference.

TECHNICAL FIELD

The present invention relates to a projection lens barrel and a projection display device.

BACKGROUND ART

A projection lens barrel of a projection display device is heated by light from a light source. There has been known a problem that when the projection lens barrel increases in temperature by this heating, optical characteristics of the projection lens barrel change to cause reduction in image quality of a projected image. JP 2008-26864A discloses a projection lens barrel including a correction mechanism that corrects the position of a lens group so as to correct a focal length that changes due to an increase in temperature of the projection lens barrel. However, regarding the reduction in image quality of a projected image caused by the increase in temperature of the projection lens barrel, the image quality reduces not only due to changes in a focal point but also due to other changes in optical characteristics.

SUMMARY OF THE INVENTION

Thus, an object of the present invention is to provide a projection lens barrel and a projection display device that are capable of correcting optical characteristics of a plurality of lens groups.

In order to solve the above-described problem, a projection lens barrel includes a lens optical system causing light from an image display element to be formed as a projected image on a screen and includes correction mechanisms that move each of at least two or more lens groups along an optical axis, the lens groups each having different optical characteristics to be corrected in order to suppress reduction in image quality of the projected image caused by changes in optical characteristics caused by temperature changes in the projection lens barrel, and correct the optical characteristics to be corrected.

Further, in addition to the above-described invention, out of the two or more lens groups having the correction mechanisms, at least the one lens group is a back focus correcting lens group capable of correcting back focus as the optical characteristics to be corrected, and the other at least one lens group is a field curvature correcting lens group capable of correcting field curvature as the optical characteristics to be corrected.

Further, in addition to the above-described invention, a lens group that is moved for focusing is the field curvature correcting lens group.

Further, in addition to the above-described invention, the field curvature correcting lens group is disposed on a screen side with respect to the back focus correcting lens group.

Further, in addition to the above-described invention, the correction mechanism is provided on at least one lens group out of lens groups disposed on an image display element side with respect to a stop of the projection lens barrel.

Further, in addition to the above-described invention, at least the one lens group is a lens group adjacent to the stop.

Further, in addition to the above-described invention, the stop is disposed inside a casing of a projection display device to which the projection lens barrel is attached.

Further, in addition to the above-described invention, out of the correction mechanisms, at least the one correction mechanism is provided on a lens group that is disposed on a place which is a screen side with respect to a lens group adjacent to a stop of the projection lens barrel on the screen side, and the place which is outside of a casing of a projection display device to which the projection lens barrel is attached.

In order to solve the above-described problem, the projection lens barrel of the projection display device is set to the above-described projection lens barrel.

DESCRIPTION OF THE EMBODIMENTS

Hereinafter, there will be explained a projection lens barrel 100 according to an embodiment of the present invention with reference to the drawings.

First Embodiment

Figure 1:
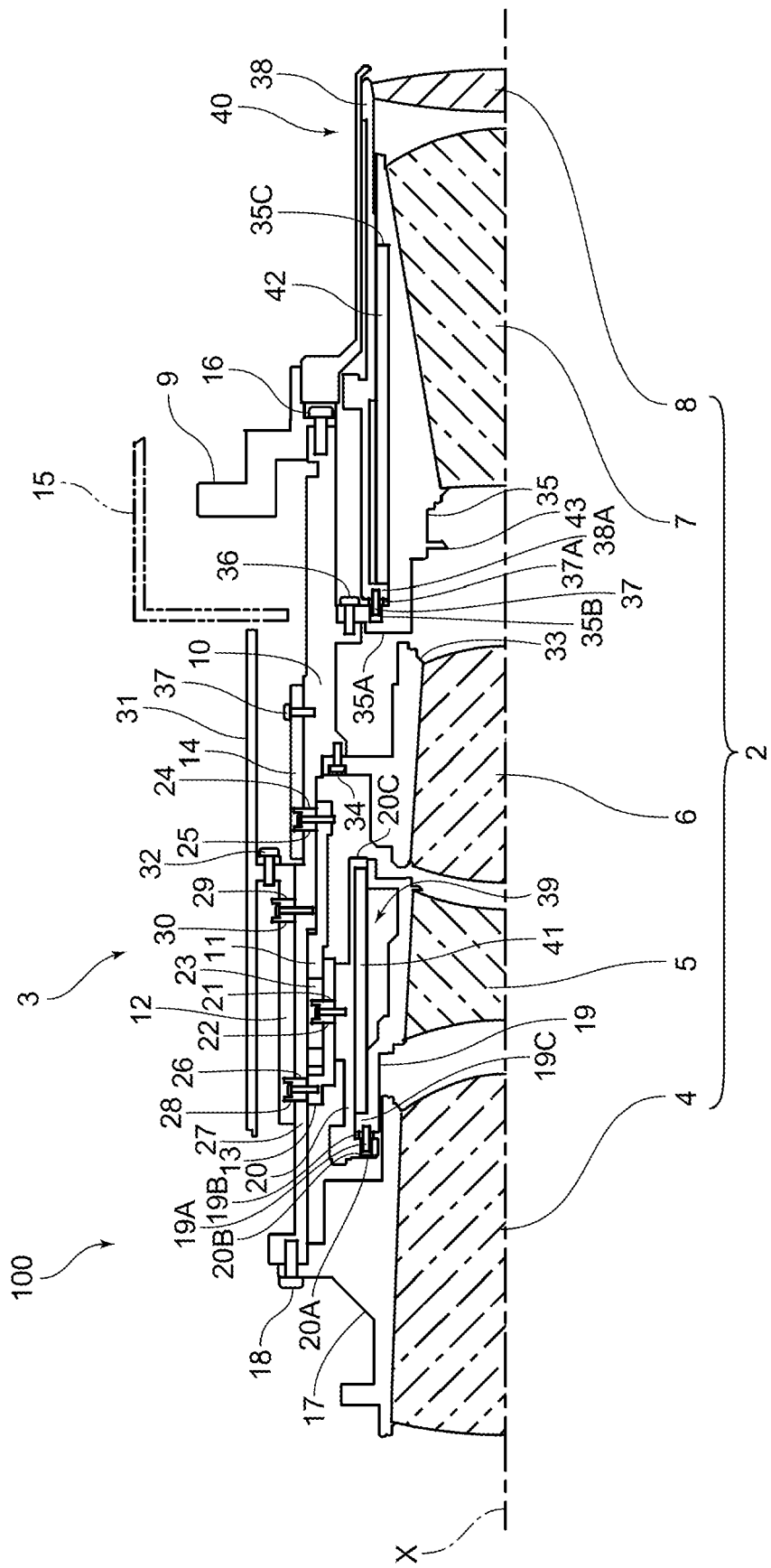
FIG. 1 is a view for explaining a configuration of a projection lens barrel according to a first embodiment of the present invention.

FIG. 1 is a view for explaining a configuration of the projection lens barrel 100 according to a first embodiment of the present invention. FIG. 1 is a view illustrating a schematic configuration of, of a cross section including an optical axis X of the projection lens barrel 100, the one-sided cross section across the optical axis X. In FIG. 1, light from a not-illustrated image display element travels from the right to the left of the projection lens barrel 100 and exits to the left from the projection lens barrel 100. The light exited from the projection lens barrel 100 is projected onto a not-illustrated screen.

In the following explanation, the explanation is made with the traveling direction of light passing through the projection lens barrel 100 set to the front (front side) and the direction opposite thereto set to the rear (rear side). Incidentally, in each of the drawings to be explained below including FIG. 1, hatching of a cross-sectional portion is omitted as necessary in order to make the drawing understandable.

(Schematic Configuration of the Projection Lens Barrel 100)

The projection lens barrel 100 has a lens optical system 2 and a lens barrel 3. The lens optical system 2 has a first lens group 4, a second lens group 5, a third lens group 6, a fourth lens group 7, and a fifth lens group 8 sequentially from the front. The first lens group 4, the third lens group 6, and the fourth lens group 7 each are a fixed lens. The second lens group 5 and the fifth lens group 8 each are a movable lens. Incidentally, a configuration of each of the lens groups illustrated in the drawing is simplified, and the actual lens optical system 2 is configured appropriately according to required optical characteristics.

The second lens group 5 is moved for the following three purposes. The first purpose is that the second lens group 5 is moved in order to perform positioning of the second lens group 5 so that the projection lens barrel 100 can be set to have predetermined optical characteristics in an adjusting process, which is one process out of assembly processes of the projection lens barrel 100. The second purpose is that the second lens group 5 is moved in order to perform focus adjustment of an image when the projection lens barrel 100 forms a projected image on a screen. The third purpose is that the second lens group 5 is moved in order to correct deterioration of field curvature caused by an increase in temperature of the projection lens barrel 100 when the projection lens barrel 100 projects a projected image onto a screen.

The fifth lens group 8 is moved in order to correct deviation of back focus caused by an increase in temperature of the projection lens barrel 100 when the projection lens barrel 100 projects a projected image onto a screen.

The lens barrel 3 has a flange part 9, a fixed barrel 10, a straight guide barrel 11, a first cam barrel 12, a second cam barrel 13, a rotary ring 14, and so on. The flange part 9 functions as an attaching part attaching the projection lens barrel 100 to a casing 15 of a not-illustrated projection display device. The fixed barrel 10 is fixed to the flange part 9 by a screw 16. The straight guide barrel 11, the first cam barrel 12, the second cam barrel 13, the rotary ring 14, and so on are attached to the fixed barrel 10. The first cam barrel 12 and the rotary ring 14 are disposed on an outer periphery of the fixed barrel 10. The straight guide barrel 11 is disposed on an inner periphery of the fixed barrel 10. The second cam barrel 13 is disposed on an inner periphery of the straight guide barrel 11.

(Holding Structure of the First Lens Group 4)

The first lens group 4 is held by a first lens group holding frame 17. The first lens group holding frame 17 is attached and fixed to a front end portion of the fixed barrel 10 by a screw 18. Thereby, the first lens group 4 held by the first lens group holding frame 17 is fixed to the fixed barrel 10.

(Holding Structure of the Second Lens Group 5)

Figure 2:
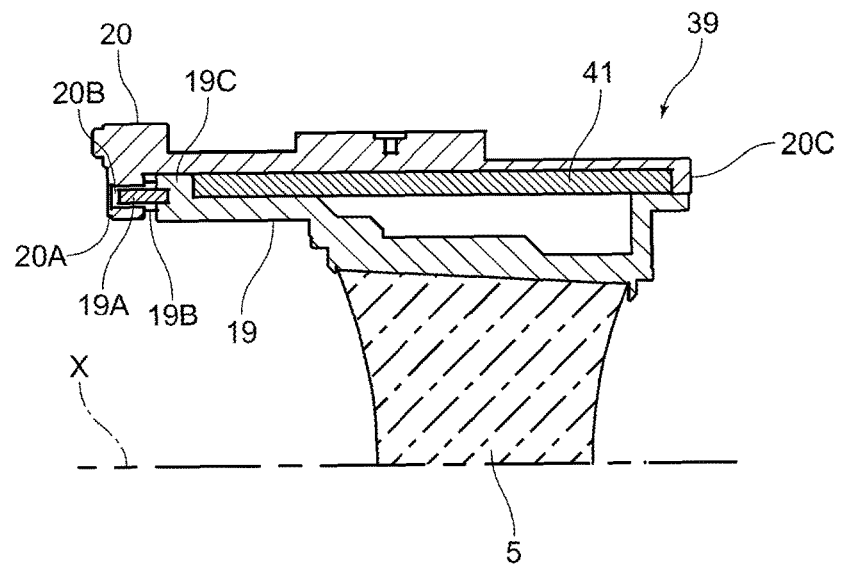
FIG. 2 is a view illustrating a holding structure portion of a second lens group of the projection lens barrel illustrated in FIG. 1 in an enlarged manner.

There will be explained a holding structure of the second lens group 5 with reference to FIG. 2 in addition to FIG. 1. FIG. 2 is a view illustrating a holding structure portion of the second lens group 5 of the projection lens barrel 100 in an enlarged manner.

The second lens group 5 is held by a second lens group holding frame 19. The second lens group 5 is attached to the second cam barrel 13 via the second lens group holding frame 19 and an outer peripheral barrel 20. A pin 19A protruding forward is provided at a front end portion of the second lens group holding frame 19. A flange part 20A protruding inward (to the optical axis X side) is formed at a front end portion of the outer peripheral barrel 20. In the flange part 20A, a hole portion 20B allowing the pin 19A to be guided movably in a forward and rearward direction is formed. That is, the second lens group holding frame 19 is coupled to the outer peripheral barrel 20 in a state of being guided movably in the forward and rearward direction by the pin 19A being inserted into the hole portion 20B. The pin 19A is passed through a coil of a coil spring 19B, and the coil spring 19B applies force against the flange part 20A to thrust the second lens group holding frame 19 rearward.

Between the second lens group holding frame 19 and the outer peripheral barrel 20 disposed on an outer periphery of the second lens group holding frame 19, a thermal deforming frame 41 is disposed. At the front end portion of the second lens group holding frame 19, a flange part 19C protruding to the outer periphery side (side going away from the optical axis X) is formed. Further, at a rear end portion of the outer peripheral barrel 20, a flange part 20C protruding inward is formed.

The thermal deforming frame 41 is disposed between the second lens group holding frame 19 and the outer peripheral barrel 20 in a state of having a front end thereof abut on the flange part 19C and having a rear end thereof abut on the flange part 20C. As described above, the second lens group holding frame 19 is thrusted rearward by the coil spring 19B. Therefore, the thermal deforming frame 41 is sandwiched between the flange part 19C of the second lens group holding frame 19 and the flange part 20C of the outer peripheral barrel 20 in a state of being thrusted rearward.

The thermal deformation frame 41 is formed of a material such as POM (polyoxymethylene) having a linear expansion coefficient larger than that of the other members configuring the lens barrel 3, for example. The fixed barrel 10, the straight guide barrel 11, the first cam barrel 12, the second cam barrel 13, and the rotary ring 14, which configure the lens barrel 3, are each formed of a material such as aluminum having a linear expansion coefficient smaller than that of POM.

On the outer peripheral barrel 20, a first cam follower 21 is provided (see FIG. 1). The first cam follower 21 engages with a second cam groove 22 formed in the second cam barrel 13 and a straight guide groove 23 formed in the straight guide barrel 11.

The straight guide barrel 11 and the rotary ring 14 are integrally coupled via a cam follower 24. The cam follower 24 is inserted in a groove 25 formed in the fixed barrel 10. The groove 25 is a groove that passes through the fixed barrel 10 between its inner periphery and its outer periphery and is parallel to a circumferential direction of the optical axis X. Therefore, the straight guide barrel 11 and the rotary ring 14 can rotate along the circumferential direction of the optical axis X with the cam follower 24 being guided by the groove 25. Incidentally, the rotation of the straight guide barrel 11 and the rotary ring 14 in the circumferential direction is performed in the adjusting process of the assembly processes of the projection lens barrel 100, and after completion of the adjusting process, the rotary ring 14 is fixed to the fixed barrel 10 by a pin 37.

At a front end portion of the second cam barrel 13, a second cam follower 26 is provided. The second cam follower 26 engages with a straight guide groove 27 formed in the fixed barrel 10 and a second cam groove 28 formed in the first cam barrel 12.

On the fixed barrel 10, a cam follower 29 protruding to the outer periphery is provided. In the first cam barrel 12, a groove 30 is formed in which the cam follower 29 is inserted. The groove 30 is a groove that passes through the first cam barrel 12 between its inner periphery and its outer periphery and is parallel to the circumferential direction of the optical axis X. Therefore, the first cam barrel 12 can rotate along the circumferential direction of the optical axis X with the cam follower 29 being guided by the groove 30.

On an outer periphery of the first cam barrel 12, a decorative ring 31 is provided, and the decorative ring 31 is integrally coupled to the first cam barrel 12 by a screw 32. Therefore, when a user (operator) of the projection lens barrel 100 rotates the decorative ring 31 in the circumferential direction of the optical axis X, the first cam barrel 12 also rotates integrally with the decorative ring 31.

(Holding Structure of the Third Lens Group 6)

The third lens group 6 is held by a third lens group holding frame 33. The third lens group holding frame 33 is attached and fixed to the fixed barrel 10 by a screw 34. Thereby, the third lens group 6 held by the third lens group holding frame 33 is fixed to the fixed barrel 10.

(Holding Structure of the Fourth Lens Group 7)

Figure 3:
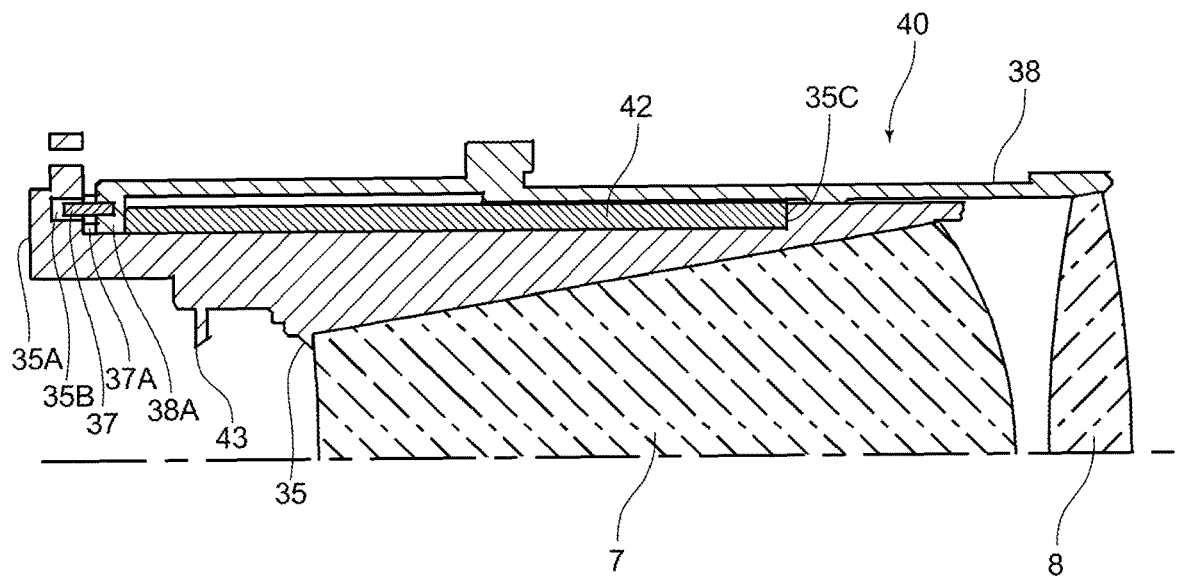
FIG. 3 is a view illustrating a holding structure portion of a fourth lens group of the projection lens barrel illustrated in FIG. 1 in an enlarged manner.

There will be explained a holding structure of the fourth lens group 7 with reference to FIG. 3 in addition to FIG. 1. FIG. 3 is a view illustrating a holding structure portion of the fourth lens group 7 of the projection lens barrel 100 in an enlarged manner.

The fourth lens group 7 is held by a fourth lens group holding frame 35. The fourth lens group holding frame 35 is attached to the fixed barrel 10. At a front end portion of the fourth lens group holding frame 35, a flange part 35A protruding outward (to the side going away from the optical axis X) is formed. The flange part 35A is fixed to the fixed barrel 10 by a screw 36, and the fourth lens group holding frame 35 is attached to the fixed barrel 10 in a fixed state. Thereby, the fourth lens group 7 held by the third lens group holding frame 33 is fixed to the fixed barrel 10.

(Holding Structure of the Fifth Lens Group 8)

There will be explained a holding structure of the fifth lens group 8 with reference to FIG. 3 in addition to FIG. 1. FIG. 3 is a view illustrating a holding structure portion of the second lens group 5 of the projection lens barrel 100 in an enlarged manner.

The fifth lens group 8 is held by a fifth lens group holding frame 38 and is attached to the fixed barrel 10 via the fifth lens group holding frame 38 and the fourth lens group holding frame 35. At a front end portion of the fifth lens group holding frame 38, a pin 37 protruding forward is provided.

In the flange part 35A, a hole portion 35B allowing the pin 37 to be guided movably in the forward and rearward direction is formed. That is, the fifth lens group holding frame 38 is coupled to the fourth lens group holding frame 35 in a state of being guided movably in the forward and rearward direction by the pin 37 being inserted into the hole portion 35B. The pin 37 is passed through a coil of a coil spring 37A, and the coil spring 37A applies force against the flange part 35A to thrust the fifth lens group holding frame 38 rearward.

Between the fourth lens group holding frame 35 and the fifth lens group holding frame 38, a thermal deforming frame 42 is disposed. At a rear end portion of the fourth lens group holding frame 35, a step surface 35C facing forward is formed. The thermal deformation frame 42 is disposed between the fourth lens group holding frame 35 and the fifth lens group holding frame 38 in a state of having a front end thereof abut on the flange part 38A and having a rear end thereof abut on the step surface 35C. The fifth lens group holding frame 38 is thrusted rearward by the coil spring 37A. Therefore, the thermal deforming frame 42 is sandwiched between the flange part 38A of the fifth lens group holding frame 38 and the step surface 35C of the fourth lens group holding frame 35 in a state of being thrusted rearward.

The thermal deforming frame 42 is, similarly to the thermal deforming frame 41, formed of, for example, POM as a material having a linear expansion coefficient larger than that of the other members configuring the lens barrel 3.

(Movement of the Second Lens Group 5)

Regarding the movements of the second lens group 5, there will be explained movement for adjustment that is performed in the assembly processes of the projection lens barrel 100 and movement for performing focus adjustment when the projection lens barrel 100 forms a projected image on a screen.

The movement at the adjusting process of the assembly processes can be performed by rotating the rotary ring 14. The rotary ring 14 is rotated in a state where the second cam barrel 13 is stopped rotating by using a jig or the like so as not to rotate about the optical axis X. At this time, the straight guide barrel 11 integrally coupled to the rotary ring 14 via the cam follower 24 also rotates together.

When the straight guide barrel 11 rotates, the straight guide barrel groove 23 moves in the circumferential direction of the optical axis X to move the first cam follower 21 engaging with the straight guide barrel groove 23 in the circumferential direction. Thereby, the first cam follower 21 engaging with the second cam groove 22 is moved forward and rearward along the shape of the second cam groove 22 while being guided by the second cam groove 22. That is, when the rotary ring 14 is rotated, the outer peripheral barrel 20 having the first cam follower 21 provided thereon is moved forward and rearward along the shape of the second cam groove 22. Then, the second lens group 5 held by the outer peripheral barrel 20 via the second lens group holding frame 19 also moves forward and rearward along the second cam groove 22 together with the outer peripheral barrel 20. After the adjustment of the second lens group 5 at the adjusting process is completed, the rotary ring 14 is fixed to the fixed barrel 10 by the pin 37.

The movement at the focus adjustment can be performed by rotating the decorative ring 31 fixed to the first cam barrel 12. When the decorative ring 31 is rotated, the first cam barrel 12 is rotated. When the first cam barrel 12 rotates, the second cam follower 26 whose movement in the circumferential direction of the optical axis X is restricted by the straight guide barrel groove 27 moves forward and rearward along the shape of the second cam groove 28. That is, the second cam barrel 13 having the second cam follower 26 provided thereon moves forward and rearward along the shape of the second cam groove 28.

When the second cam barrel 13 moves forward and rearward, the second cam groove 22 formed in the second cam barrel 13 also moves forward and rearward. The first cam follower 21 engages with the second cam groove 22. Therefore, when the second cam groove 22 moves forward and rearward, the first cam follower 21 also moves forward and rearward and the outer peripheral barrel 20 having the first cam follower 21 provided thereon also moves. Then, the second lens group holding frame 19 coupled to the outer peripheral barrel 20 also moves together with the outer peripheral barrel 20, and the second lens group 5 held by the second lens group holding frame 19 moves. That is, when the decorative ring 31 is rotated, the second lens group 5 moves forward and rearward along the shape of the second cam groove 28.

(Correction Mechanisms 39 and 40)

In the projection lens barrel 100, a correction mechanism 39 and a correction mechanism 40 are provided. The correction mechanism 39 is provided on the second lens group 5, and mainly has a function of correcting deterioration of field curvature caused by an increase in temperature of the projection lens barrel 100. Further, the correction mechanism 40 is provided on the fifth lens group 8, and mainly has a function of correcting change of back focus caused by an increase in temperature of the projection lens barrel 100.

(Correction Mechanism 39)

The correction mechanism 39 has the second lens group holding frame 19, the outer peripheral barrel 20, the pin 19A, the coil spring 19B, the thermal deforming frame 41, and so on. When the projection lens barrel 100 is heated to increase in temperature, the thermal deformation frame 41 expands in the forward and rearward direction according to the increased temperature to move the second lens group holding frame 19 forward while resisting a thrust force of the coil spring 19B. By this movement of the second lens group holding frame 19, the second lens group 5 moves, and thereby the correction of field curvature is mainly performed. The linear expansion coefficient, volume, and the like of the thermal deforming frame 41 are set so that a correction amount of the correction mechanism 39 coincides with a correction amount necessary for the field curvature corresponding to the temperature of the projection lens barrel 100.

(Correction Mechanism 40)

The correction mechanism 40 has the fourth lens group holding frame 35, the fifth lens group holding frame 38, the pin 37, the coil spring 37A, the thermal deforming frame 42, and so on. When the projection lens barrel 100 is heated to increase in temperature, the thermal deforming frame 42 expands in the forward and rearward direction according to the increased temperature to move the fifth lens group holding frame 38 forward while resisting a thrust force of the coil spring 37A. By this movement of the fourth lens group holding frame 35, the second lens group 5 moves, and thereby the correction of back focus is mainly performed. The linear expansion coefficient, volume, and the like of the thermal deforming frame 42 are set so that a correction amount of the correction mechanism 40 coincides with a correction amount necessary for the back focus corresponding to the temperature of the projection lens barrel 100.

Principal Effects of the First Embodiment

The projection lens barrel 100 according to the first embodiment includes the lens optical system 2 that causes light from a not-illustrated image display element to be formed as a projected image on a not-illustrated screen. The second lens group 5 and the fifth lens group 8 have different optical characteristics to be corrected (to be described as "elements to be corrected" hereinafter) in order to suppress reduction in image quality of the projected image as a result of changes in optical characteristics caused by temperature changes in the projection lens barrel 100. The second lens group 5 of the projection lens barrel 100 is a field curvature correcting lens group, and is a lens group capable of effectively correcting the field curvature as compared to the other lens groups. In the meantime, the fifth lens group 8 is a back focus correcting lens group, and is a lens group capable of effectively correcting the back focus as compared to the other lens groups. Then, the projection lens barrel 100 includes the correction mechanism 39 on the second lens group 5, and further includes the correction mechanism 40 also on the fifth lens group 8.

As described above, providing the correction mechanism on each of the second lens group 5 and the fifth lens group 8 makes it possible to individually move the second lens group 5 and the fifth lens group 8 along the optical axis X and correct the field curvature and the back focus as the elements to be corrected. Further, the projection lens barrel 100 includes the correction mechanism 39 on the second lens group 5 that is capable of effectively correcting the field curvature as compared to the other lens groups, and includes the correction mechanism 40 on the fifth lens group 8 that is capable of effectively correcting the back focus as compared to the other lens groups.

In this manner, the correction mechanism is individually provided on the lens group capable of effectively correcting the element to be corrected that is desired to be corrected, thereby making it possible to effectively correct the changes in optical characteristics caused when the projection lens barrel 100 increases in temperature. In contrast to this, if only the single element to be corrected is set as an object to be corrected with the single lens group tentatively, there is a risk that due to the correction of the single element to be corrected, another element to be corrected becomes serious. The projection lens barrel 100 includes the correction mechanism on each of the lens groups intended for the elements to be corrected, to thus be able to correct the elements to be corrected effectively.

Second Embodiment

Figure 4:
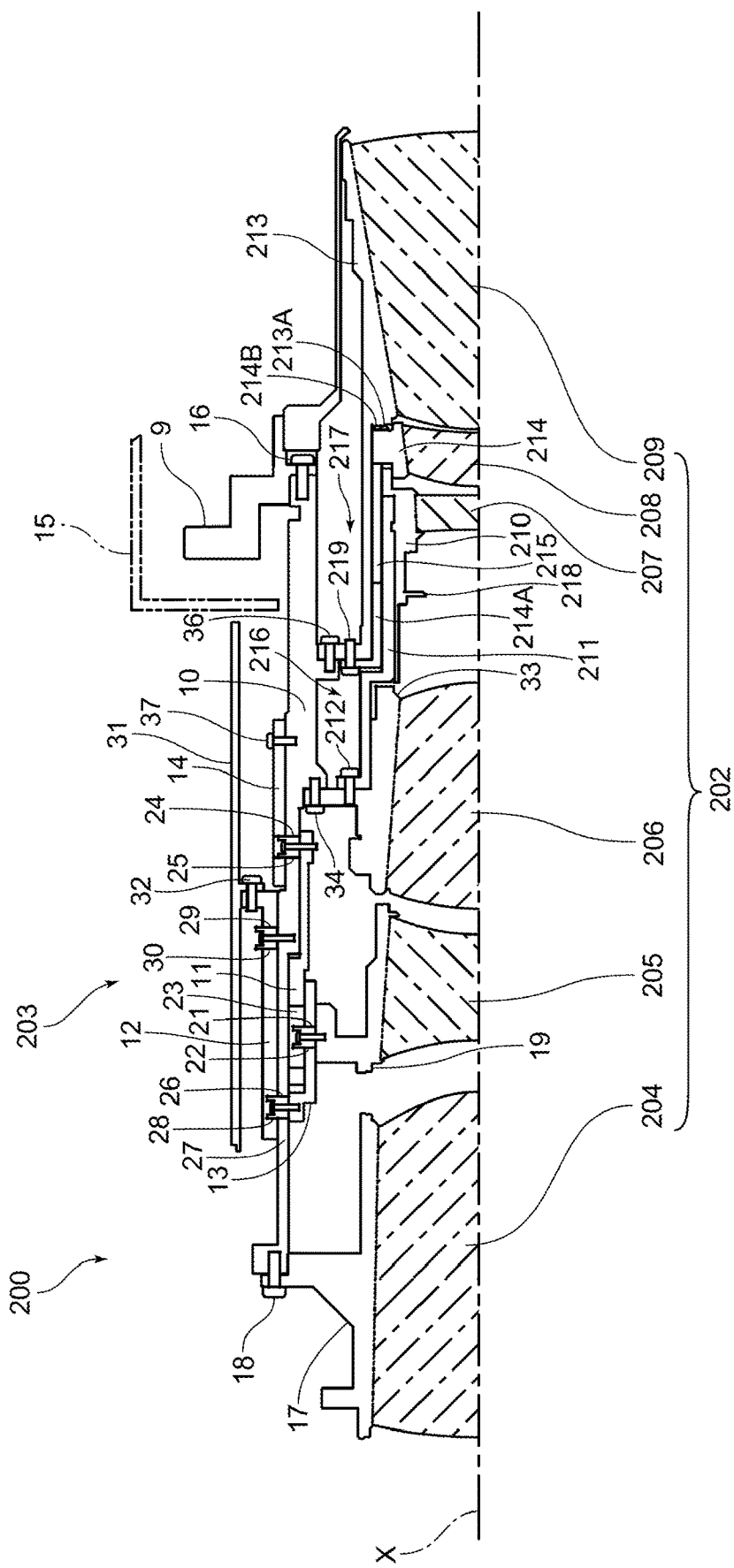
FIG. 4 is a view for explaining a configuration of a projection lens barrel according to a second embodiment of the present invention.

FIG. 4 is a view for explaining a configuration of a projection lens barrel 200 according to a second embodiment of the present invention, and is a view illustrating a schematic configuration of, of a cross section including an optical axis X of the projection lens barrel 200, the one-sided cross section across the optical axis X. The same forward and rearward direction as in FIG. 1 is applied, and the same reference numerals and symbols are added to the same components as those of the projection lens barrel 100, and their explanations are omitted or simplified.

(Schematic Configuration of the Projection Lens Barrel 200)

The projection lens barrel 200 has a lens optical system 202 and a lens barrel 203. The lens optical system 202 has a first lens group 204, a second lens group 205, a third lens group 206, a fourth lens group 207, a fifth lens group 208, and a sixth lens group 209 sequentially from the front. The first lens group 204, the third lens group 206, and the sixth lens group 209 each are a fixed lens. The second lens group 205, the fourth lens group 207, and the fifth lens group 208 each are a movable lens. Incidentally, a configuration of each of the lens groups illustrated in the drawing is simplified, and the actual lens optical system 202 is configured appropriately according to required optical characteristics.

The second lens group 205 is moved for the following two purposes. The first purpose is that the second lens group 205 is moved in order to perform positioning of the second lens group 205 so that the projection lens barrel 200 can be set to have predetermined optical characteristics in an adjusting process, which is one process out of assembly processes of the projection lens barrel 200. The second purpose is that the second lens group 205 is moved in order to perform focus adjustment of an image when the projection lens barrel 200 forms a projected image on a screen.

The fourth lens group 207 is moved in order to correct back focus deviation caused by an increase in temperature of the projection lens barrel 200 when the projection lens barrel 200 projects a projected image onto a screen. The fifth lens group 208 is moved in order to correct deterioration of field curvature caused by an increase in temperature of the projection lens barrel 200 when the projection lens barrel 200 projects a projected image onto a screen.

The second lens group 205 is held by a second lens group holding frame 19. On the second lens group holding frame 19, a first cam follower 21 that engages with a second cam groove 22 formed in a second cam barrel 13 and a straight guide groove 23 formed in a straight guide barrel 11 is provided. Thereby, the second lens group 205 can move by rotationally operating a rotary ring 14 at the adjusting process of the assembly processes, thereby making it possible to set the projection lens barrel 200 to have predetermined optical characteristics.

On the fourth lens group 207, a correction mechanism 216 is provided. The correction mechanism 216 mainly has a function of correcting back focus deviation caused by an increase in temperature of the projection lens barrel 200. The correction mechanism 216 has a fourth lens group holding frame 210, a thermal deforming frame 211, and so on. The fourth lens group 207 is held by the fourth lens group holding frame 210. The thermal deforming frame 211 is integrally attached to the fourth lens group holding frame 210. The fourth lens group holding frame 210 is attached to a rear end side of the thermal deforming frame 211, and a front end portion of the thermal deforming frame 211 is attached to a third lens group holding frame 33 by a screw 212. The thermal deforming frame 211 is fixed to the third lens group holding frame 33.

When the projection lens barrel 200 is heated to increase in temperature, the thermal deforming frame 211 expands in the forward and rearward direction according to the increased temperature to move the fourth lens group 207 rearward. By this movement of the fourth lens group 207, the fourth lens group 207 moves, and thereby the correction of back focus is mainly performed. A linear expansion coefficient, volume, and the like of the thermal deforming frame 211 are set so that a correction amount of the correction mechanism 216 coincides with a correction amount necessary for the back focus corresponding to the temperature of the projection lens barrel 200.

On the fifth lens group 208, a correction mechanism 217 is provided. The correction mechanism 217 mainly moves the fifth lens group 208 in order to correct deterioration of field curvature caused by an increase in temperature of the projection lens barrel 200. The correction mechanism 217 has a fifth lens group holding frame 214, a thermal deforming frame 215, an outer peripheral barrel 214A, and so on.

The thermal deforming frame 215 and the outer peripheral barrel 214A are disposed on an outer periphery of the thermal deformation frame 211. The fifth lens group 208 is held by the fifth lens group holding frame 214. The fifth lens group holding frame 214 is held on an inner periphery of a sixth lens group holding frame 213 in a state of being guided movably in the forward and rearward direction. The thermal deforming frame 215 is disposed at a front side of the fifth lens group holding frame 214. The outer peripheral barrel 214A is disposed at a front side of the thermal deformation frame 215. A front end portion of the outer peripheral barrel 214A is attached and fixed to a front end portion of the sixth lens group holding frame 213 by a screw 219.

On the sixth lens group holding frame 213, a step surface 213A facing forward is formed at a position facing a rear end surface of the fifth lens group holding frame 214. Between the step surface 213A and the rear end surface of the fifth lens group holding frame 214, a wave washer 214B is provided. The wave washer 214B applies force against the step surface 213A of the sixth lens group holding frame 213 to thrust the fifth lens group holding frame 214 forward. Therefore, the thermal deforming frame 215 is sandwiched between the sixth lens group holding frame 213 and the outer peripheral barrel 214A in a state of being thrusted forward.

When the projection lens barrel 200 is heated to increase in temperature, the thermal deforming frame 215 expands in the forward and rearward direction according to the increased temperature to move the fifth lens group 208 rearward while resisting a thrust force of the wave washer 214B. By this movement of the fifth lens group 208, the fifth lens group 208 moves, and thereby the correction of field curvature is mainly performed. A linear expansion coefficient, volume, and the like of the thermal deforming frame 215 are set so that a correction amount of the correction mechanism 217 coincides with a correction amount necessary for the field curvature corresponding to the temperature of the projection lens barrel 200. Incidentally, the thermal deforming frame 211 and the thermal deforming frame 215 are formed of a material such as POM having a linear expansion coefficient larger than that of the other members configuring the lens barrel 303.

Principal Effects of the Second Embodiment

The projection lens barrel 200 according to the second embodiment includes the lens optical system 202 that causes light from a not-illustrated image display element to be formed as a projected image on a not-illustrated screen. The fourth lens group 207 and the fifth lens group 208 have different optical characteristics to be corrected (elements to be corrected) in order to suppress reduction in image quality of the projected image as a result of changes in optical characteristics caused by temperature changes in the projection lens barrel 200.

The fourth lens group 207 of the projection lens barrel 200 is a back focus correcting lens group, and is a lens group capable of effectively correcting the back focus as compared to the other lens groups. In the meantime, the fifth lens group 208 is a field curvature correcting lens group, and is a lens group capable of effectively correcting the field curvature as compared to the other lens groups. Then, the projection lens barrel 200 includes the correction mechanism 216 on the fourth lens group 207, and further includes the correction mechanism 217 also on the fifth lens group 208.

As described above, providing the correction mechanism on each of the fourth lens group 207 and the fifth lens group 208 makes it possible to individually move the fourth lens group 207 and the fifth lens group 208 along the optical axis X and correct the field curvature and the back focus as the elements to be corrected. Further, the projection lens barrel 200 includes the correction mechanism 216 on the fourth lens group 207 that is capable of effectively correcting the back focus as compared to the other lens groups, and includes the correction mechanism 217 on the fifth lens group 208 that is capable of effectively correcting the field curvature as compared to the other lens groups. In this manner, the correction mechanism is individually provided on the lens group capable of effectively correcting the element to be corrected that is desired to be corrected, thereby making it possible to effectively correct the changes in optical characteristics caused when the projection lens barrel 200 increases in temperature. In contrast to this, if only the single element to be corrected is set as an object to be corrected with the single lens group tentatively, there is a risk that due to the correction of the single element to be corrected, another element to be corrected becomes serious. The projection lens barrel 200 includes the correction mechanism on each of the lens groups intended for the elements to be corrected, to thus be able to correct the elements to be corrected effectively.

Third Embodiment

Figure 5:
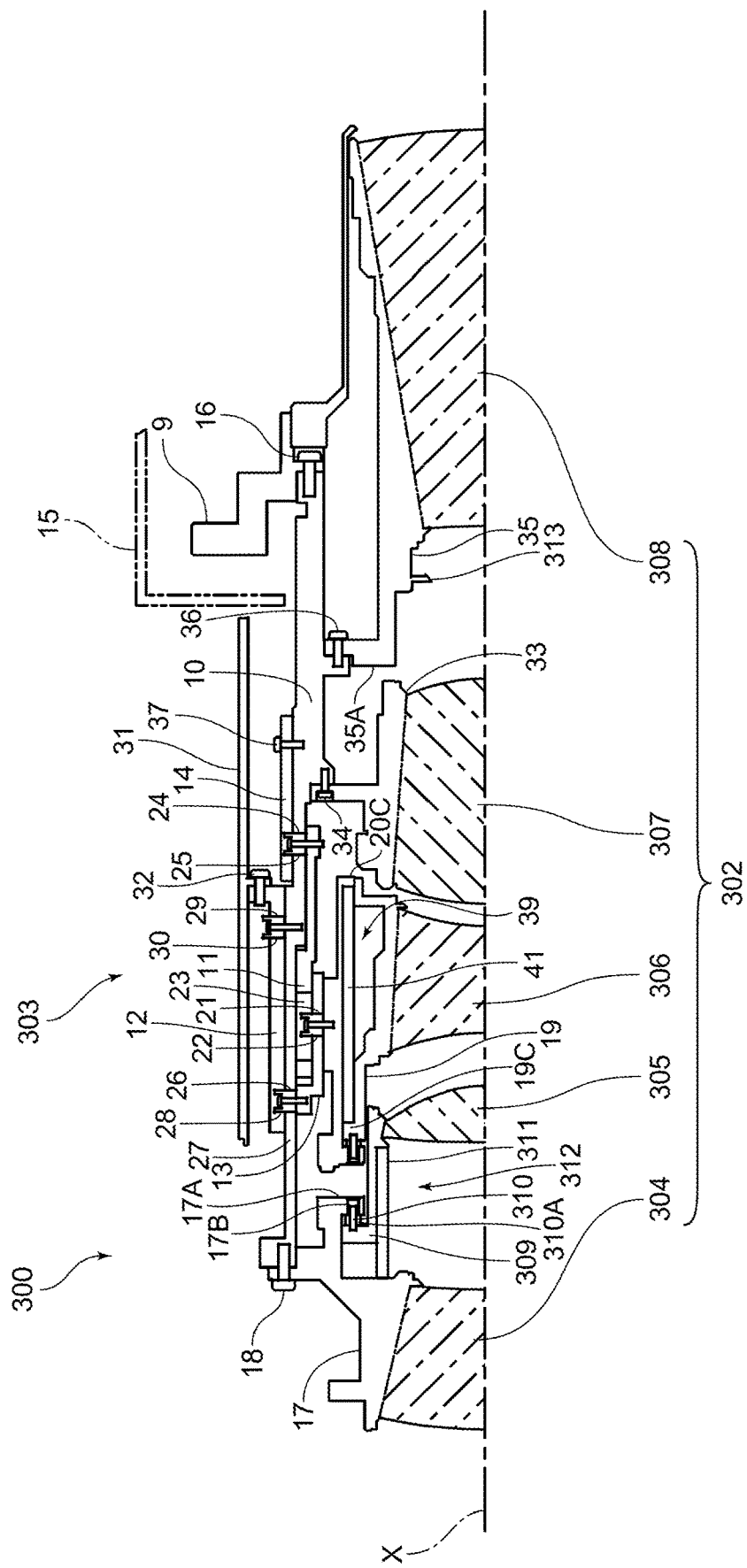
FIG. 5 is a view for explaining a configuration of a projection lens barrel according to a third embodiment of the present invention.

FIG. 5 is a view for explaining a configuration of a projection lens barrel 300 according to a third embodiment of the present invention, and is a view illustrating a schematic configuration of, of a cross section including an optical axis X of the projection lens barrel 300, the one-sided cross section across the optical axis X. The same forward and rearward direction as in FIG. 1 is applied, and the same reference numerals and symbols are added to the same components as those of the projection lens barrel 100, and their explanations are omitted or simplified.

(Schematic Configuration of the Projection Lens Barrel 300)

The projection lens barrel 300 has a lens optical system 302 and a lens barrel 303. The lens optical system 302 has a first lens group 304, a second lens group 305, a third lens group 306, a fourth lens group 307, and a fifth lens group 308 sequentially from the front. The first lens group 304, the fourth lens group 307, and the fifth lens group 308 each are a fixed lens. The second lens group 305 and the third lens group 306 each are a movable lens. Incidentally, a configuration of each of the lens groups illustrated in the drawing is simplified, and the actual lens optical system 302 is configured appropriately according to required optical characteristics.

The second lens group 305 performs movement for correcting back focus deviation caused by an increase in temperature of the projection lens barrel 300 when the projection lens barrel 300 projects a projected image onto a screen.

The third lens group 306 can be moved for the following three purposes. The first purpose is that the third lens group 306 is moved in order to perform positioning of the third lens group 306 so that the projection lens barrel 300 can be set to have predetermined optical characteristics in an adjusting process, which is one process out of assembly processes of the projection lens barrel 300. The second purpose is that the third lens group 306 is moved in order to perform focus adjustment of an image when the projection lens barrel 300 forms a projected image on a screen. The third purpose is that the third lens group 306 is moved in order to correct deterioration of field curvature caused by an increase in temperature of the projection lens barrel 300 when the projection lens barrel 300 projects a projected image onto a screen.

On the second lens group 305, a correction mechanism 312 is provided. The correction mechanism 312 mainly has a function of correcting back focus deviation caused by an increase in temperature of the projection lens barrel 300. The correction mechanism 312 has a second lens group holding frame 309, a thermal deforming frame 311, and so on. The second lens group 305 is held by the second lens group holding frame 309. The second lens group holding frame 309 is attached to a first lens group holding frame 17. At a front end portion of the second lens group holding frame 309, a pin 310 protruding rearward is provided. At a rear end portion of the first lens group holding frame 17, a flange part 17A protruding inward is provided. In the flange part 17A, a hole portion 17B allowing the pin 310 to be guided movably in the forward and rearward direction is formed. That is, the second lens group holding frame 309 is coupled to the first lens group holding frame 17 in a state of being guided movably in the forward and rearward direction by the pin 310 being inserted into the hole portion 17B. The pin 310 is passed through a coil of a coil spring 310A, and the coil spring 310A applies force against the flange part 17A to thrust the second lens group holding frame 309 forward.

Between the first lens group holding frame 17 and the second lens group holding frame 309, the thermal deforming frame 311 is disposed. The thermal deforming frame 311 has a front end thereof abut on a rear end surface of the first lens group holding frame 17 and has a rear end thereof abut on the second lens group holding frame 309. The second lens group holding frame 309 is thrusted forward by the coil spring 310A. Therefore, the thermal deforming frame 311 is sandwiched between the second lens group holding frame 309 and the first lens group holding frame 17 in a state of being thrusted forward. Incidentally, the thermal deforming frame 311 is formed of a material such as POM having a linear expansion coefficient larger than that of the other members configuring the lens barrel 303.

When the projection lens barrel 300 is heated to increase in temperature, the thermal deforming frame 311 expands in the forward and rearward direction according to the increased temperature to move the second lens group holding frame 309 rearward. By this movement of the second lens group holding frame 309, the second lens group 305 moves, and thereby the correction of back focus is mainly performed. The linear expansion coefficient, volume, and the like of the thermal deforming frame 311 are set so that a correction amount of the correction mechanism 312 coincides with a correction amount necessary for the back focus corresponding to the temperature of the projection lens barrel 300.

On the third lens group 306, a correction mechanism 39 is provided. By this correction mechanism 39, the third lens group 306 is moved so as to correct deterioration of field curvature caused by an increase in temperature of the projection lens barrel 300.

Principal Effects of the Third Embodiment

The projection lens barrel 300 according to the third embodiment includes the lens optical system 302 that causes light from a not-illustrated image display element to be formed as a projected image on a not-illustrated screen. The second lens group 305 and the third lens group 306 have different optical characteristics to be corrected (to be described as "elements to be corrected" hereinafter) in order to suppress reduction in image quality of the projected image as a result of changes in optical characteristics caused by temperature changes in the projection lens barrel 300. The second lens group 305 of the projection lens barrel 300 is a back focus correcting lens group, and is a lens group capable of effectively correcting the back focus as compared to the other lens groups. In the meantime, the third lens group 306 is a field curvature correcting lens group, and is a lens group capable of effectively correcting the field curvature as compared to the other lens groups. Then, the projection lens barrel 300 includes the correction mechanism 312 on the second lens group 305, and further includes the correction mechanism 39 also on the third lens group 306.

As described above, providing the correction mechanism on each of the second lens group 305 and the third lens group 306 makes it possible to individually move the second lens group 305 and the third lens group 306 along the optical axis X and correct the field curvature and the back focus as the elements to be corrected. Further, the projection lens barrel 300 includes the correction mechanism 312 on the second lens group 305 that is capable of effectively correcting the back focus as compared to the other lens groups, and includes the correction mechanism 39 on the third lens group 306 that is capable of effectively correcting the field curvature as compared to the other lens groups. In this manner, the correction mechanism is individually provided on the lens group capable of effectively correcting the element to be corrected that is desired to be corrected, thereby making it possible to effectively correct the changes in optical characteristics caused when the projection lens barrel 300 increases in temperature. In contrast to this, if only the single element to be corrected is set as an object to be corrected with the single lens group tentatively, there is a risk that due to the correction of the single element to be corrected, another element to be corrected becomes serious. The projection lens barrel 300 includes the correction mechanism on each of the lens groups intended for the elements to be corrected, to thus be able to correct the elements to be corrected effectively.

The above-described projection lens barrel 100 includes the correction mechanism 39 on the second lens group 5 that is capable of effectively correcting the field curvature. In general, in the lens optical system, the shorter the focal distance is, the more the field curvature is likely to occur in a projected image. However, like the projection lens barrel 100, the correction mechanism 39 is provided on the second lens group 5 capable of correcting the field curvature thereby making it possible to effectively correct the field curvature even when the projection lens barrel 100 is configured to have short focus and wide-angle.

Although in the projection lens barrel 100, the second lens group 5 is a lens group capable of effectively correcting the field curvature and the fifth lens group 8 is a lens group capable of effectively correcting the back focus, they are one example. That is, regarding on which lens group the correction mechanism is provided, the correction mechanism is appropriately provided on the lens group capable of effectively correcting the intended element to be corrected according to the configuration and the characteristics of the projection lens barrel 100.

In the projection lens barrels 200 and 300 as well, the correction mechanism (the correction mechanism 217 in the projection lens barrel 200, the correction mechanism 39 in the projection lens barrel 300) is provided on the lens group (the fifth lens group 208 in the projection lens barrel 200, the third lens group 306 in the projection lens barrel 300) that is capable of correcting the field curvature similarly, thereby making it possible to effectively correct the field curvature that is likely to occur when the projection lens barrels 200 and 300 are each configured to have short focus and wide-angle.

In the projection lens barrel 200, the fifth lens group 208 is a lens group capable of effectively correcting the field curvature, and the fourth lens group 207 is a lens group capable of effectively correcting the back focus. Further, in the projection lens barrel 300, the third lens group 306 is a lens group capable of effectively correcting the field curvature, and the second lens group 305 is a lens group capable of effectively correcting the back focus. They are one example. That is, regarding on which lens group the correction mechanism is provided, the correction mechanism is appropriately provided on the lens group capable of effectively correcting the intended element to be corrected according to the configurations and the characteristics of the projection lens barrels 200 and 300.

Although in the projection lens barrels 100, 200, and 300, the elements to be corrected are set to the field curvature and the back focus, the elements to be corrected are not limited to these, and according to the optical characteristics of the lens optical systems 2, 202, and 302, other elements to be corrected (spherical aberration, coma aberration, astigmatism, and distortion) can also be combined. The number of combinations of the elements to be corrected may be set to three or more, and providing the correction mechanism on the lens groups capable of effectively correcting the respective elements to be corrected enables the effective correction.

Figure 6:
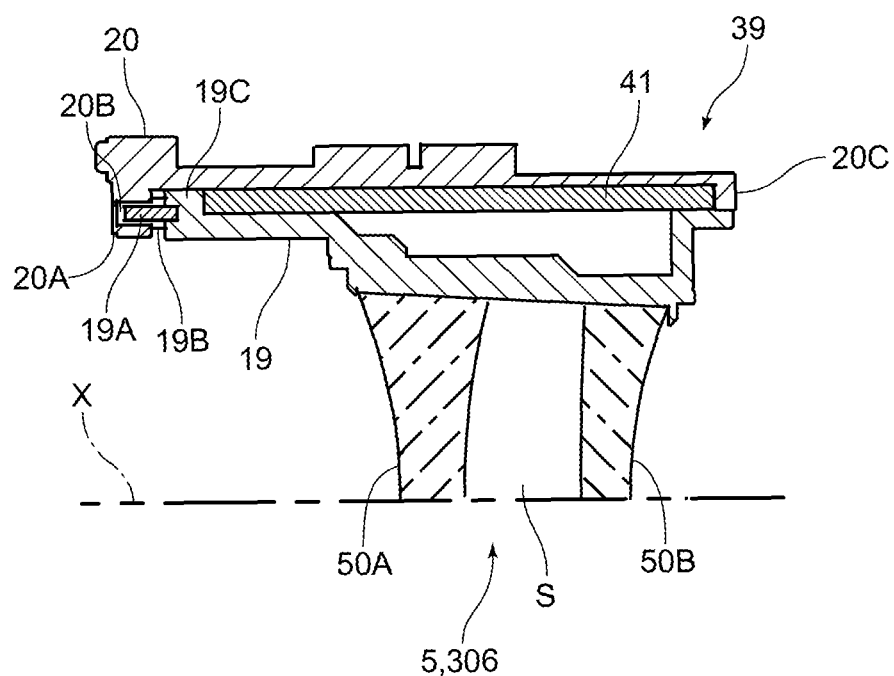
FIG. 6 is a view illustrating a configuration of a lens group forming an intermediate image between lenses.

The second lens group 5 illustrated in the projection lens barrel 100 and the third lens group 306 illustrated in the projection lens barrel 300 each may have two lenses of lens 50A and lens 50B disposed with an interval (space S) apart from each other as illustrated in a schematic configuration in FIG. 6, and the lens optical systems 2 and 302 of the projection lens barrels 100 and 300 each may be configured to form an intermediate image in the space S formed between the lens 50A and the lens 50B.

In FIG. 6, the number of lenses configuring the lens group is set to two, but the number is not limited to two, and may be three or more. The projection lens barrels 100 and 300 each can be configured to form an intermediate image between the adjacent lenses with an interval provided therebetween.

The second lens group 5 of the projection lens barrel 100 is a field curvature correcting lens capable of correcting field curvature as well as a lens group to be moved for performing focusing, and includes the correction mechanism 39 provided thereon. Further, the third lens group 306 of the projection lens barrel 300 is also a field curvature correcting lens capable of correcting field curvature as well as a lens group to be moved for performing focusing, and includes the correction mechanism 39 provided thereon. That is, the projection lens barrels 100 and 300 are each configured that the second lens group 5 (the projection lens barrel 100) and the third lens group 306 (the projection lens barrel 300), which are the lens group to be moved for performing focusing, are set as the field curvature correcting lens group and are moved by the correction mechanism 39.

The projection lens barrels 100 and 300 can effectively correct the field curvature by setting the lens group that is moved for performing focusing as the field curvature correcting lens group as above.

When it is configured that the lens group to be moved for performing focusing is set as the field curvature correcting lens group and the intermediate image is formed between the lenses configuring the field curvature correcting lens group, as illustrated in FIG. 6, the space where the intermediate image is formed between the lenses is to be preferably sealed. When there is dust in the space S, the dust sometimes adhere onto a lens surface. When the intermediate image is formed on the lens surfaces of the lenses forming the space S, the dust adhering onto the lens surface sometimes burns, or the lens surface is sometimes contaminated by the burned dust. Further, the dust in the space S is sometimes shown in a projected image on a screen.

Therefore, the space S is preferably sealed so as to prevent dust from entering the space S. The configuration in which a periphery around the optical axis X is surrounded by the second lens group holding frame 19 and the periphery at the front and the periphery at the rear are closed by the lens 50A and the lens 50B is formed, and thereby the space S is sealed.

The second lens group 5, which is the field curvature correcting lens group of the projection lens barrel 100, is disposed on a screen side, namely forward, with respect to the fourth lens group 7, which is the back focus correcting lens group.

In this manner, the second lens group 5, which is the field curvature correcting lens group, is disposed at the front and the fourth lens group 7, which is the back focus correcting lens group, is disposed at the rear, and thereby the effect of the correction by the second lens group 5 does not easily affect on a change in the back focus and the effect of the correction by the fourth lens group 7 does not easily affect on a change in the field curvature.

The projection lens barrel 100 includes the correction mechanism 40 provided on the fifth lens group 8 that is a lens group disposed on an image display element side with respect to a stop 43, namely rearward. Further, the projection lens barrel 200 includes the correction mechanism 216 provided on the fourth lens group 207 that is a lens group disposed on an image display element side with respect to a stop 218, namely rearward, and further includes the correction mechanism 217 provided on the fifth lens group 208 that is a lens group disposed rearward with respect to the stop 218 similarly.

The stops 43 and 218 block part of the light from the image display element. Therefore, the lens groups disposed rearward with respect to the stops 43 and 218 are likely to be heated by the blocked light. Further, a light source unit and a control circuit installed inside the casing 15 of the projection display device also generate heat in operation. By the heating of these, the lens groups disposed rearward with respect to the stops 43 and 218 are likely to change in optical characteristics. Therefore, in the projection lens barrel 100, the correction mechanism 40 is provided on the fifth lens group 8 that is a lens group disposed rearward with respect to the stop 43, thereby making it possible to correct the changes in optical characteristics of the fifth lens group 8. This correction makes it possible to suppress changes in optical performance of the entire lens optical system 2 and reduce image quality deterioration of a projected image. Further, in the projection lens barrel 200, the correction mechanism 216 is provided on the fourth lens group 207 that is a lens group disposed rearward with respect to the stop 218, and additionally, the correction mechanism 217 is provided on the fifth lens group 208, thereby making it possible to correct the changes in optical characteristics of the fourth lens group 207 and the fifth lens group 208. This correction makes it possible to suppress changes in optical performance of the entire lens optical system 202 and reduce image quality deterioration of a projected image.

Further, the projection lens barrel 200 includes the correction mechanism 216 provided on the fourth lens group 207 adjacent to the stop 218. The fourth lens group 207 is the closest to the stop 218 of the lens groups disposed rearward with respect to the stop 218, to thus be most affected by the heat effect of the heated stop 218, resulting in that the optical characteristics are likely to change extremely. Accordingly, providing the correction mechanism 216 on the fourth lens group 207 adjacent to the stop 218 makes it possible to correct the changes in optical characteristics of the fourth lens group 207. This correction makes it possible to suppress changes in optical performance of the entire lens optical system 202 and reduce image quality deterioration of a projected image.

The stop 43 of the projection lens barrel 100 is disposed inside the casing 15 of the not-illustrated projection display device. The inside of the casing 15 is likely to be high in temperature due to heat generation of the light source unit, the control circuit themselves, light from the image display element, and heating of the stop 43. Therefore, when the stop 43 is disposed inside the casing 15, the correction mechanism 40 is provided on the fifth lens group 8, which is a lens group located rearward with respect to the stop 43, thereby making it possible to correct the changes in optical characteristics of the fifth lens group 8. This correction makes it possible to suppress changes in optical performance of the entire lens optical system 2 and reduce image quality deterioration of a projected image.

Further, the stop 218 of the projection lens barrel 200 is also disposed inside the casing 15 of the not-illustrated projection display device. Therefore, when the stop 218 is disposed inside the casing 15, the correction mechanism 216 is provided on the fourth lens group 207, which is a lens group located rearward with respect to the stop 218, and the correction mechanism 217 is provided on the fifth lens group 208, thereby making it possible to correct the changes in optical characteristics of the fourth lens group 207 and the fifth lens group 208. This correction makes it possible to suppress changes in optical performance of the entire lens optical system 202 and reduce image quality deterioration of a projected image.

The projection lens barrel 100 includes the correction mechanism 39 provided on the second lens group 5, which is disposed on a screen side with respect to the third lens group 6 adjacent to the stop 43, namely forward, outside the casing 15. The inside of the casing 15 is not easily affected by external temperature changes because of heat shielding of the casing 15, to thus facilitate prediction of the temperature of the casing 15 when the projection display device is used and facilitate also prediction of the changes in optical characteristics. Therefore, the lens optical system 2 disposed inside the casing 15 is optically designed so as to have optical characteristics according to the predicted temperature, thereby making it possible to reduce image quality deterioration of a projected image in some cases. In contrast to this, the second lens group 5 disposed across the third lens group 6 from the stop 43 outside the casing 15 easily follows the temperature changes outside the casing 15, resulting in difficulty in predicting the changes in optical characteristics. Accordingly, providing the correction mechanism 39 on the second lens group 5 makes it possible to correct the optical characteristics of the entire lens optical system 2 according to the temperature changes outside the casing 15.

The projection lens barrel 300 includes the correction mechanism 312 provided on the second lens group 305, which is disposed on a screen side with respect to the fourth lens group 307 adjacent to the stop 313, namely forward, outside the casing 15, and further includes the correction mechanism 39 provided on the third lens group 306. Providing the correction mechanisms 312 and 39 on the second lens group 305 and the third lens group 306 disposed outside the casing 15 as above makes it possible to correct the optical characteristics of the entire lens optical system 302 according to the temperature changes outside the casing 15.

The invention claimed is:
1. A projection lens barrel including a lens optical system that causes light from an image display element to form a projected image on a screen, the projection lens barrel comprising:
at least two correction lens groups that each have different optical characteristics to be corrected in order to sup- press reduction in image quality of the projected image, the reduction in image quality being caused by changes in optical characteristics that result from a change in temperature in the projection lens barrel;

a correction mechanism that is provided to each correction lens group, and that moves each correction lens group along an optical axis;

wherein the correction mechanism includes;

a thermal deforming frame that expands along an optical axis according to change in temperature;

a one end side holding part that abuts and holds one optical-axis end side of the thermal deforming frame in a state of abutting without being fixed thereto; and an other end side holding part that abuts and holds an other optical-axis end side of the thermal deforming frame without being fixed thereto;

wherein each correction lens group is moved by expansion of the thermal deforming frame so as to correct the optical characteristics; and the one end side holding part is energized to the rear side by a coil spring, and/or the other end side holding part is energized to the forward side by the coil spring.

2. The projection lens barrel according to claim 1, wherein the thermal deforming frame is formed of material having a linear expansion coefficient that is greater than that of the other members configuring the lens barrel.

3. The projection lens barrel according to claim 1, wherein a first correcting mechanism of each of the correcting mechanism includes:

a first correction lens holding frame that holds a first correction lens group to be corrected by the first correcting mechanism; and an outer peripheral barrel disposed at outer peripheral of the first correction lens holding frame;

wherein a thermal deforming frame of the first correction mechanism is disposed between the first correction lens holding frame and the outer peripheral barrel.

4. The projection lens barrel according to claim 1, wherein a second correcting mechanism of each correcting mechanism includes:

a second correction lens holding frame that holds a second correction lens group to be corrected by the second correcting mechanism; and a first front side lens holding flame which holds a lens group disposed at front side of the second correction lens group;

wherein a front side of the thermal deforming flame of the second correcting mechanism is fixed to the first lens holding flame, and a rear side of the thermal deforming flame of the second correcting mechanism is fixed to the second correction lens holding frame.

5. The projection lens barrel according to claim 1, wherein a third correcting mechanism of each correcting mechanism includes:

a third correcting lens holding flame that holds a third correction lens group to be corrected by the third correcting mechanism, a rear side lens holding flame that holds a lens group disposed at rear side of the third correction lens group;

a wave washer disposed between the third correction lens holding frame and the rear side lens holding frame; and an outer peripheral barrel that is disposed at outer circumference of the thermal deforming frame of the second correcting mechanism, the thermal deforming frame being disposed at front side of the third correction lens holding frame and attached to the front end of the rear side lens holding frame;

wherein a thermal deforming frame of the third correction mechanism is situated and pinched between the third correction lens holding frame and the outer peripheral barrel in a state of being energized forward by a force of the wave washer.

6. The projection lens barrel according to claim 1, wherein a fourth correcting mechanism of each correcting mechanism includes:

a fourth correction lens holding frame that holds a fourth correction lens group to be corrected by the fourth correcting mechanism; and a second front side lens holding frame that holds a lens group disposed at a front side of the fourth correction lens group;

wherein the fourth correction lens holding frame is movably coupled to the second lens holding frame in a state of being energized forward, a front end of a thermal deforming frame of the fourth correction mechanism abuts to the second front side lens holding frame, and a rear end of the thermal deforming frame abuts to the fourth correction lens holding frame.

7. The projection lens barrel according to claim 1, wherein of the two or more correction lens groups provided to the correction mechanism, at least one correction lens group is a back focus correcting lens group capable of correcting back focus as the optical characteristics to be corrected, and at least the other correction lens group is a field curvature correcting lens group capable of correcting field curvature as the optical characteristics to be corrected.

8. The projection lens barrel according to claim 7, wherein the correction lens group moved for focusing is the field curvature correcting lens group.

9. The projection lens barrel according to claim 7, wherein the field curvature correcting lens group is disposed on screen side with respect to the back focus correcting lens group.

10. The projection lens barrel according to claim 7, wherein the correction mechanism is provided to at least one lens group of lens groups disposed on the image display element side with respect to a stop of the projection lens barrel.

11. The projection lens barrel according to claim 10, wherein at least the one lens group of lens groups is a lens group adjacent to the stop.

12. The projection lens barrel according to claim 10, wherein the stop is disposed inside a casing of a projection display device to which the projection lens barrel is attached.

13. The projection lens barrel according to claim 11, wherein the stop is disposed inside a casing of a projection display device to which the projection lens barrel is attached.

14. The projection lens barrel according to claim 7, wherein of the correction mechanisms, at least the one correction mechanism is provided on a lens group that is disposed on a location which is a screen side with respect to a lens group adjacent to a stop of the projection lens barrel on the screen side, and at a location which is outside of a casing of a projection display device to which the projection lens barrel is attached.

15. A projection display device comprising the projection lens barrel according to claim 1.

* * * * *